US007961457B2

(12) United States Patent
Huang

(10) Patent No.: US 7,961,457 B2
(45) Date of Patent: Jun. 14, 2011

(54) DISPLAY HOUSING WITH INTERLOCKING MEMBERS

(75) Inventor: Hsieh-Ting Huang, Miao-Li (TW)

(73) Assignee: Chimei Innolux Corporation, Miao-Li County (TW)

( * ) Notice: Subject to any disclaimer, the term of this patent is extended or adjusted under 35 U.S.C. 154(b) by 74 days.

(21) Appl. No.: 12/456,716

(22) Filed: Jun. 22, 2009

(65) Prior Publication Data

US 2009/0316341 A1   Dec. 24, 2009

(30) Foreign Application Priority Data

Jun. 20, 2008   (CN) .......................... 2008 1 0067935

(51) Int. Cl.
    *G06F 1/16*   (2006.01)
(52) U.S. Cl. ..................................... 361/679.21; 349/58
(58) Field of Classification Search ............. 361/679.21; 349/58
    See application file for complete search history.

(56) References Cited

U.S. PATENT DOCUMENTS

| 6,894,739 | B2 * | 5/2005 | Sung et al. ....................... 349/58 |
| 6,919,937 | B2 * | 7/2005 | Kim et al. ........................ 349/58 |
| 6,976,781 | B2 | 12/2005 | Chu et al. |
| 2006/0002060 | A1 * | 1/2006 | Ling .............................. 361/679 |
| 2008/0129921 | A1 * | 6/2008 | Huang et al. ..................... 349/60 |
| 2008/0158473 | A1 * | 7/2008 | Liang ............................. 349/60 |
| 2008/0266485 | A1 * | 10/2008 | Shen et al. ....................... 349/59 |

FOREIGN PATENT DOCUMENTS

| CN | 1540405 A | 10/2004 |
| CN | 1561081 A | 1/2005 |
| CN | 1776501 A | 5/2006 |

* cited by examiner

*Primary Examiner* — Lisa Lea-Edmonds
(74) *Attorney, Agent, or Firm* — Wei Te Chung

(57) ABSTRACT

A display housing includes a first housing part including a plurality of first engaging members, a second housing part including a plurality of second engaging members, and a plurality of interlocking members, each of which is snappingly and detachably connected to and interlocks a respective one of the first engaging members and a respective one of the second engaging members. Engagement of each interlocking member with the respective first engaging member prevents relative movement between the first and second housing parts along directions of a first axis of a Cartesian coordinate system, along directions of a second axis of the Cartesian coordinate system, and along directions of a third axis of the Cartesian coordinate system. The first, second and third axes all being perpendicular to one another.

11 Claims, 7 Drawing Sheets

DISPLAY HOUSING WITH INTERLOCKING MEMBERS

CROSS-REFERENCE TO RELATED APPLICATION

This application is related to, and claims the benefit of, a foreign priority application filed in China as Application No. 200810067935.6 on Jun. 20, 2008. The related application is incorporated herein by reference.

BACKGROUND

1. Technical Field

The present disclosure relates to a display housing, and more particularly to a display housing having first and second housing parts connected by interlocking members.

2. Description of Related Art

Referring to FIG. 8, a conventional display housing for a display panel, such as a liquid crystal display (LCD) panel 12, normally includes a front frame 11 and a rear frame 14. Typically, a driving circuit board 13 mounted and coupled electrically to the display panel 12 is also accommodated in the display housing.

The front frame 11 includes a base wall 111, and four sidewalls 112 extending respectively from four sides of the base wall 111. A plurality of lug plates 113 is formed on and protrudes outwardly from the sidewalls 112. Each of the lug plates 113 is formed with a plurality of holes 114. The rear frame 14 includes a base wall 141, and four sidewalls 142 extending from four sides of the base wall 141. A plurality of hook members 145 is formed on and protrudes from the sidewalls 142 of the rear frame 14. In assembly, the driving circuit board 13 is mounted and coupled to the display panel 12. The driving circuit board 13 together with the display panel 12 is then fitted into a frame space defined by the rear frame 14. The front frame 11 is subsequently impelled toward the rear frame 14 and engaged thereto by snap fitting the hook members 145 into the holes 114 of the lug plates 113.

The lug plates 113 are configured to be slightly flexible to permit snap fit engagement of the hook members 145 in the holes 114. Accordingly, the lug plates 113 often have the form of a thin wall. As a consequence, the lug plates 113 have relatively low mechanical strength and tend to break during the snap fitting. If even only one lug plate 113 of the front frame 11 is broken during assembly, the whole front frame 11 will not pass quality control and must typically be recycled.

BRIEF DESCRIPTION OF THE DRAWINGS

The components in the drawings are not necessarily drawn to scale, the emphasis instead being placed upon clearly illustrating the principles of at least one embodiment of the present invention. In the drawings, like reference numerals designate corresponding parts throughout the various views.

DETAILED DESCRIPTION

Figure 1:
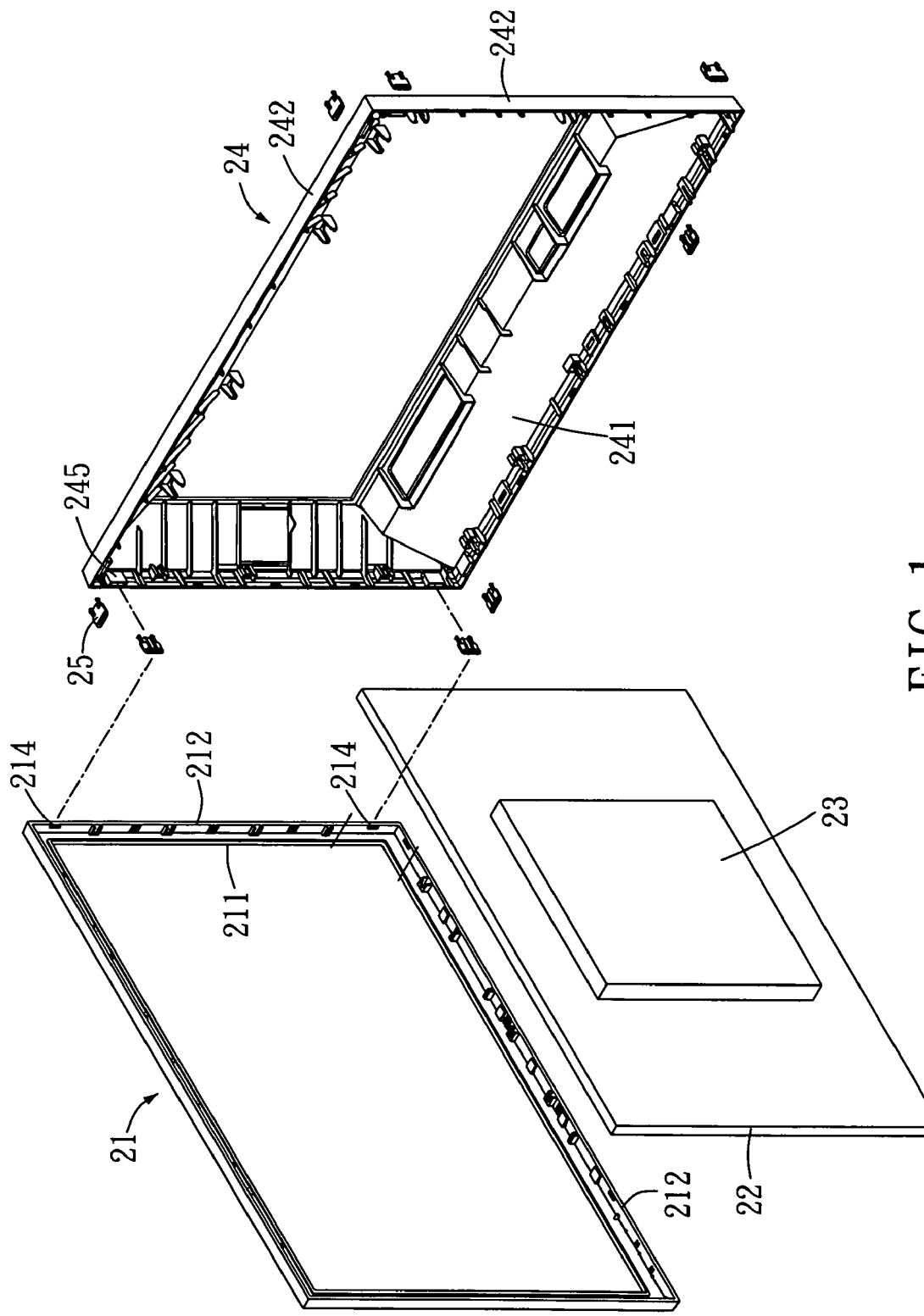
FIG. 1 is an exploded perspective view of a first embodiment of a display housing of the present invention, the display housing including first and second housing parts, a plurality of first and second engaging members, and a plurality of interlocking members which can interlock the first and second engaging members.

Reference will now be made to the drawings to describe various embodiments in detail.

Referring to FIGS. 1 to 5, a first embodiment of a display housing of the present invention is suitable for display panels, such as a liquid crystal display (LCD) panel 22. A driving circuit board 23 is mounted and electrically coupled to the display panel 22, and is accommodated in the display housing. The display housing includes a first housing part 24, a second housing part 21, and a plurality of interlocking members 25.

The first housing part 24 has a first base wall 241, a first 4-sided peripheral wall 242 extending from a periphery of the first base wall 241, and a plurality of first engaging members 245 formed on the peripheral wall 242 (see FIG. 1).

The second housing part 21 has a second base wall 211, a second 4-sided peripheral wall 212 extending from a periphery of the second base wall 211, and a plurality of second engaging members 214 formed on the second peripheral wall 212 (see FIG. 1).

Each of the interlocking members 25 is detachably connected to and interlocks a respective first engaging member 245 and a respective second engaging member 214 (see FIGS. 1 and 2) so as to secure the first housing part 24 to the second housing part 21 and to permit the first and second housing parts 24, 21 to cooperatively define an accommodating space (not labeled) therebetween. The accommodating space receives the assembly of the display panel 22 and the driving circuit board 23 therein. Each of the interlocking members 25 engages the respective first engaging member 245 and the respective second engaging member 214 in a snap fit engaging manner. The interlocking members 25 have a breaking strength less than those of the first and second engaging members 245, 214, so that in the event of breakage of the interlocking members 25 and/or the first and second engaging members 245, 214 during assembly, the breakage is apt to occur at the interlocking members 25. This protects the first and second engaging members 245, 214 from breakage when they are assembled with the interlocking members 25, whereby the first and second housing parts 24, 21 can remain usable.

Figure 2:
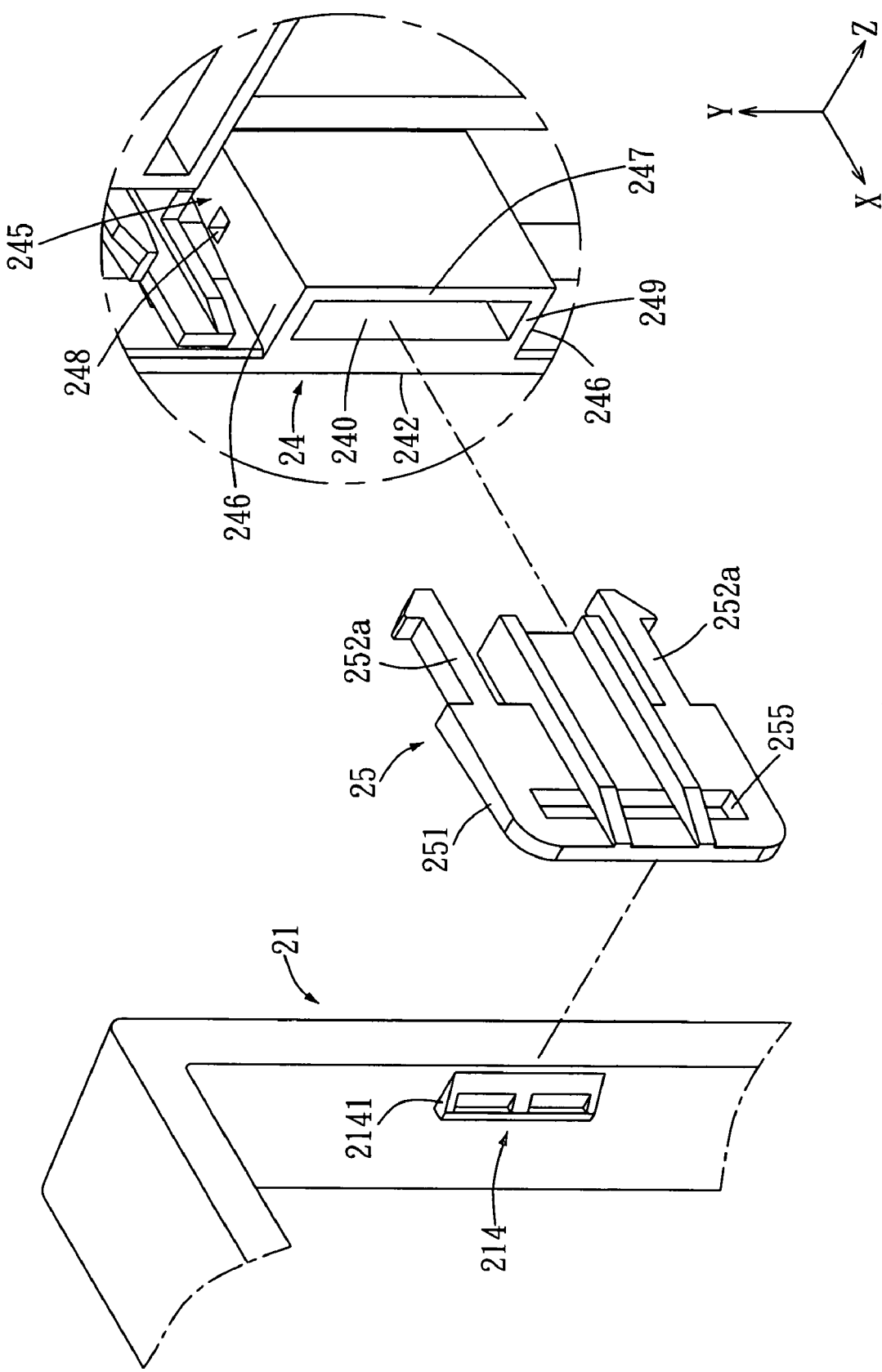
FIG. 2 is an enlarged, exploded perspective view of portions of the housing of FIG. 1, showing one main side of one interlocking member, and how the interlocking member can interlock corresponding first and second engaging members.

Each of the first engaging members 245 has two opposite lug walls 246 and an interconnecting wall 247 therebetween (see FIG. 2). The lug walls 246 protrude from the peripheral wall 242 of the first housing part 24 into the accommodating space. The interconnecting wall 247 interconnects the lug walls 246, and cooperates with the lug walls 246 and a corresponding portion of the peripheral wall 242 of the first housing part 24 to define a slot 240. Each of the lug walls 246 defines a first hook hole 248 in spatial communication with the slot 240.

Figure 3:
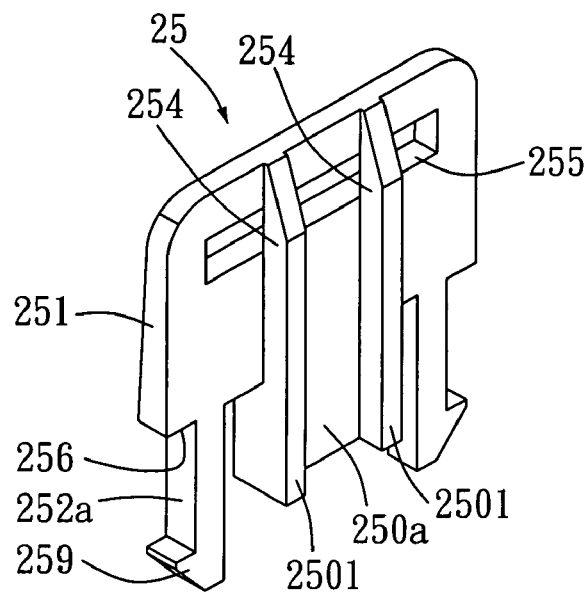
FIG. 3 is a perspective view of the interlocking member of FIG. 2, but showing the interlocking member rotated 90° therefrom.
Figure 4:
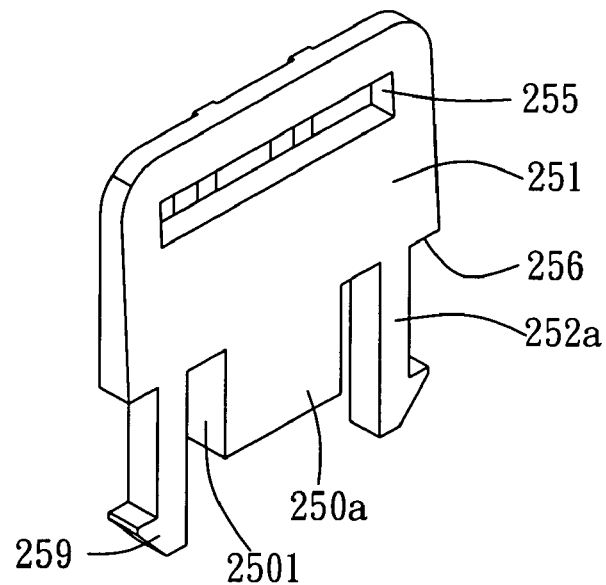
FIG. 4 is a perspective view of the interlocking member of FIG. 3, but showing the interlocking member rotated 180° therefrom and thus showing an opposite main side of the interlocking member.
Figure 5:
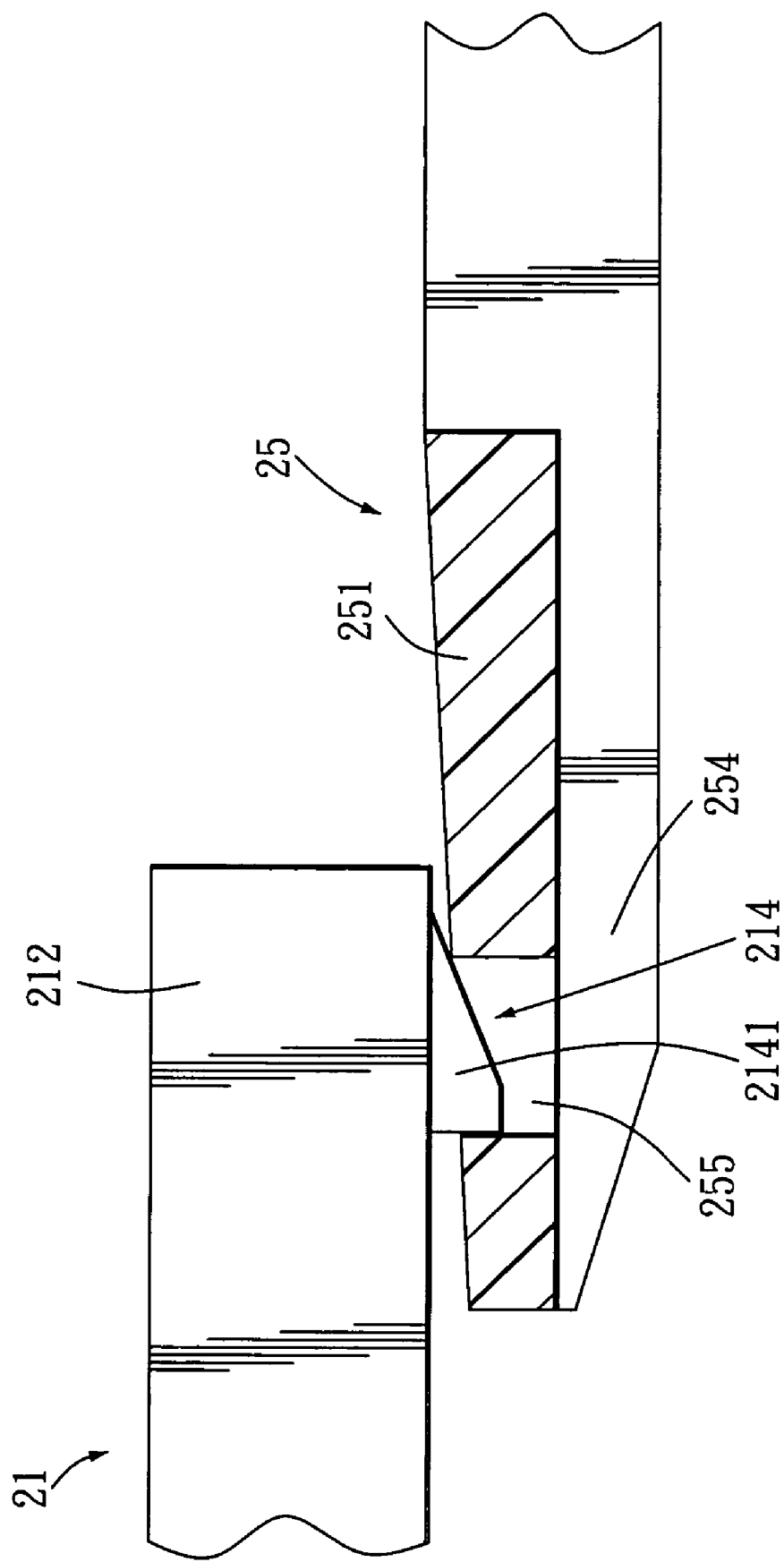
FIG. 5 is an enlarged, top plan view of a portion of the second housing member and a portion of one of the interlocking members of FIG. 1, with part of the interlocking member cut away to show engagement of the interlocking member with a corresponding second engaging member.

Each of the interlocking members 25 has a base plate 251 and two opposite cantilevers 252a extending from the base plate 251 (see FIGS. 3 and 4). Each of the cantilevers 252a has a hook end 259. The cantilevers 252a are received in the slot 240 of the respective first engaging member 245. The hook ends 259 of the cantilevers 252a engage in the first hook holes 248 of the lug walls 246 of the first engaging member 245 in a snap fit engaging manner, respectively. Thereby, in respect of the interlocking member 25 illustrated in FIG. 2, relative movement between the first and second housing parts 24, 21 in first directions (corresponding to the X-axis shown in FIG. 2) is prevented. The cantilevers 252a of each of the interlocking members 25 have a breaking strength less than those of the lug walls 246 of the respective first engaging member 245, so that in the event of breakage of the interlocking member 25 and/or the first engaging member 245 during assembly, the breakage is apt to occur at the cantilevers 252a of the interlocking member 25.

Each of the lug walls 246 of each first engaging member 245 has an end defining a shoulder 249 (see FIG. 2). Each of the cantilevers 252a of each interlocking member 25 cooperates with the base plate 251 to define an elbow 256. The elbows 256 of each interlocking member 25 engage the shoulders 249 of the lug walls 246 of the respective first engaging member 245, respectively. Thereby, in respect of the interlocking member 25 illustrated in FIG. 2, relative movement between the first and second housing parts 24, 21 in the first directions (X-axis) and in second directions (corresponding to the Y-axis shown in FIG. 2) that are transverse to the first directions (X-axis) is prevented.

Each of the interlocking members 25 further includes a limiting plate 250a extending from the base plate 251 between the cantilevers 252a. The limiting plate 250a is received in the slot 240 of the respective first engaging member 245. The limiting plate 250a has two opposite main sides, which are substantially in contact with the interconnecting wall 247 of the first engaging member 245 and the peripheral wall 242 of the first housing part 24, respectively. In addition, each of the cantilevers 252a of the interlocking member 25 is substantially in contact with the peripheral wall 242 of the first housing part 24. Thereby, in respect of the interlocking member 25 illustrated in FIG. 2, relative movement between the first and second housing parts 21, 24 in third directions (corresponding to the Z-axis shown in FIG. 2) that are transverse to both the first and second directions (X-axis, Y-axis) is prevented.

The limiting plate 250a of each interlocking member 25 has a generally U-shaped profile, and includes two opposite arms 2501 (see FIG. 3). Each interlocking member 25 further includes two parallel reinforcing ribs 254 formed on the base plate 251 and respectively connected to the arms 2501 of the limiting plate 250a. In the illustrated embodiment, each arm 2501 and the corresponding reinforcing rib 254 have the same cross-section where they meet, such that the arm 2501 and the reinforcing rib 254 together form a continuous, seamless portion. In addition, the cross-section where one of the arms 2501 and the corresponding reinforcing rib 254 meet is the same as the cross-section where the other arm 2501 and the corresponding reinforcing rib 254 meet. Furthermore, the interlocking member 25 has an integrated, one-piece construction. That is, the interlocking member 25 is a single body of material including all the above-described components.

Each of the second engaging members 214 has a lip protrusion 2141 (see FIGS. 2 and 5) protruding from the peripheral wall 212 of the second housing part 21 into the accommodating space. The base plate 251 of each of the interlocking members 25 has a hole 255. The lip protrusion 2141 of each second engaging member 214 is configured to engage in the hole 255 of the base plate 251 of the respective interlocking member 25 in a snap fit engaging manner. The base plate 251 of each interlocking member 25 has a breaking strength less than that of the lip protrusion 2141 of the respective second engaging member 214, so that in the event of breakage during assembly of the interlocking member 25 and/or the second engaging member 214, the breakage is apt occur at the base plate 251 of the interlocking member 25.

Figure 6:
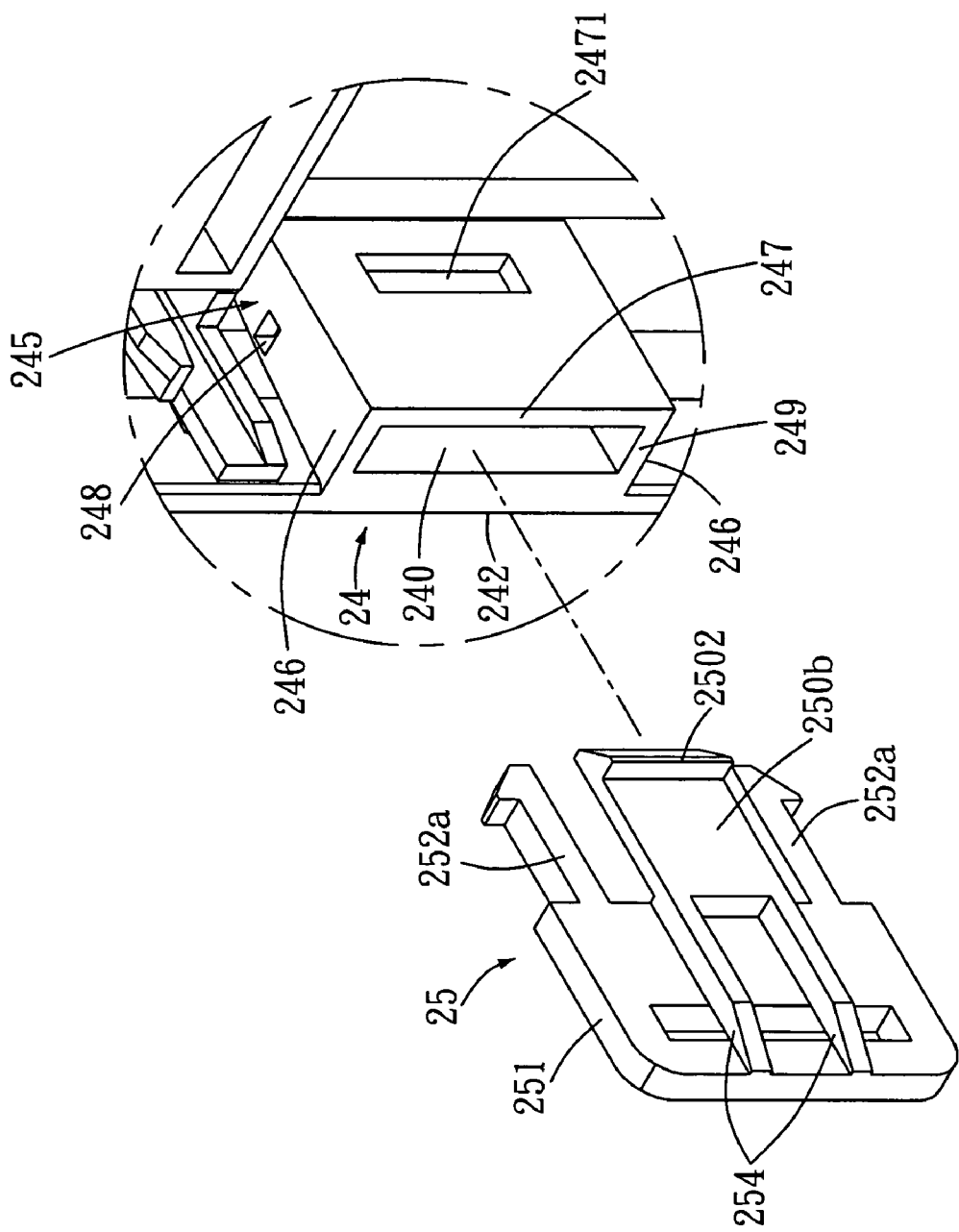
FIG. 6 is similar to FIG. 2, but showing an interlocking member and a first engaging member of a first housing part of a display housing of a second embodiment of the present invention.

Referring to FIG. 6, a display housing of a second embodiment of the present invention is similar to that of the first embodiment. However, in the second embodiment, a limiting plate 250b of each interlocking member 25 extends from the reinforcing ribs 254. The interconnecting wall 247 of each first engaging member 245 is formed with a second hook hole 2471. In this embodiment, the limiting plate 250b of each interlocking member 25 has a hook end 2502 that engages in the second hook hole 2471 of the interconnecting wall 247 of the respective first engaging member 245 in a snap fit engaging manner. In addition, the limiting plate 250b has a main side, which is substantially in contact with the interconnecting wall 247 of the first engaging member 245. Further, each of the cantilevers 252a of the interlocking member 25 is substantially in contact with the peripheral wall 242 of the first housing part 24.

Figure 7:
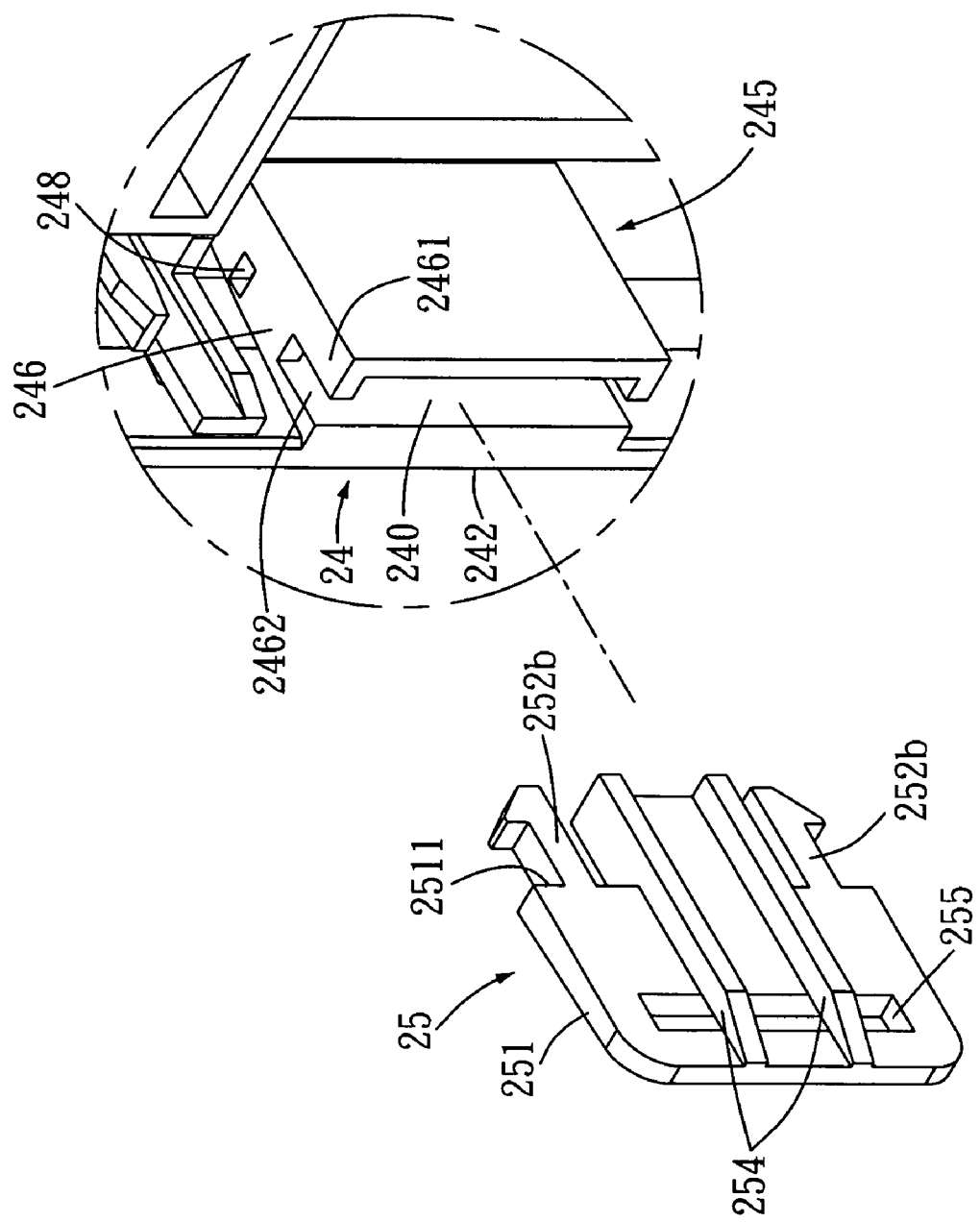
FIG. 7 is similar to FIG. 6, but showing an interlocking member and a first engaging member of a first housing part of a display housing of a third embodiment of the present invention.
Figure 8:
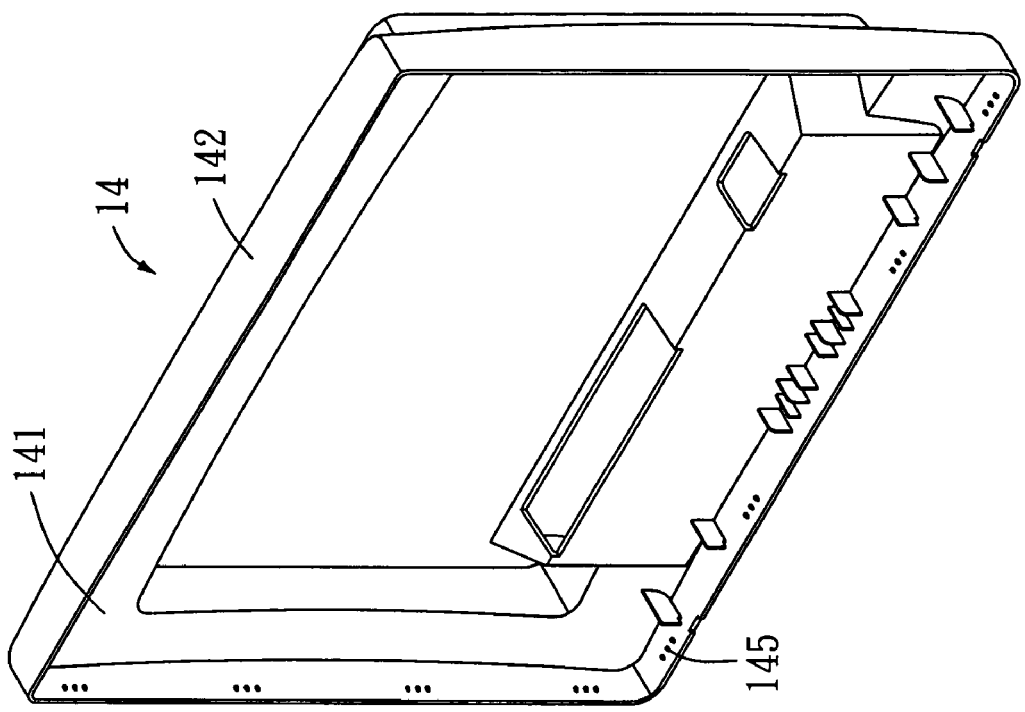
FIG. 8 is an exploded, perspective view of a conventional display housing.
Figure 8:
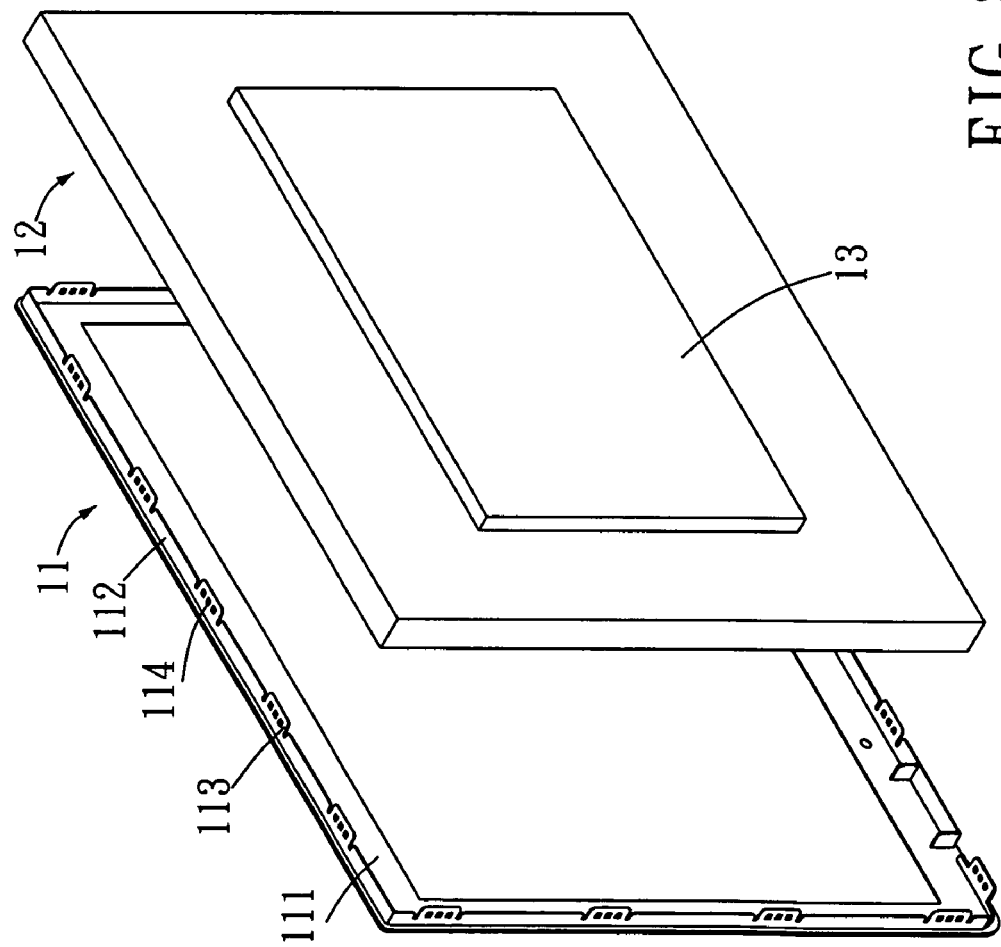

Referring to FIG. 7, a display housing of a third embodiment of the present invention is similar to that of the first embodiment. However, in the third embodiment, each of the lug walls 246 of each first engaging member 245 has an abutting end 2461, and a notch 2462 which is defined in the abutting end 2461 and which is in spatial communication with the slot 240. The base plate 251 of each interlocking member 25 has an elbow 2511. The cantilevers 252b of each interlocking member 25 extend from the base plate 251 at the elbows 2511. A portion of the base plate 251 of the interlocking member 25 is received in the slot 240 and the notches 2462 of the lug walls 246 of the first engaging member 245, in such a manner that the elbows 2511 of the base plate 251 of the interlocking member 25 are in contact with the lug walls 246 at inner ends of the notches 2462.

With the inclusion of the interlocking members 25 in the display housing, device integrity during manufacture is enhanced. Even if breakage occurs during assembly of the interlocking members 25 and the first and second housing parts 24, 21, the breakage is apt occur at one or more of the interlocking members 25 rather than at the first and second housing parts 24, 21. The first and second housing parts 24, 21 are preserved, and any broken or damaged interlocking members 25 can be economically replaced.

It is to be understood that even though numerous characteristics and advantages of the present embodiments have been set forth in the foregoing description, together with details of the structures and functions of the embodiments, the disclosure is illustrative only; and that changes may be made in detail, especially in matters of shape, size, and arrangement of parts, within the principles of the embodiments, to the full extent indicated by the broad general meaning of the terms in which the appended claims are expressed.

The invention claimed is:

1. A display housing adapted to accommodate a display panel, the display housing comprising:
   a first housing part comprising a first peripheral wall and a plurality of first engaging members formed on the first peripheral wall;
   a second housing part comprising a plurality of second engaging members; and
   a plurality of interlocking members, each of which is detachably connected to and interlocks a respective one of the first engaging members and a respective one of the second engaging members so as to secure the first housing part to the second housing part such that the first and second housing parts cooperatively define an accommodating space therebetween capable of accommodating the display panel therein;
   wherein each of the first engaging members has two opposite lug walls and an interconnecting wall, the lug walls protrude from the first peripheral wall of the first housing part into the accommodating space, the interconnecting wall interconnects the lug walls and cooperates with the lug walls and a portion of the first peripheral wall of the first housing part to define a slot, and each of the lug walls defines a hook hole in spatial communication with the slot;
   wherein each of the interlocking members comprises a base plate, two opposite cantilevers extending from the base plate, and a limiting plate extending from the base plate and being disposed between the cantilevers and received in the slot of the respective first engaging member, each of the cantilevers has a hook end, the cantilevers of each of the interlocking members are received in the slot of the respective first engaging member, the hook ends of the cantilevers of each of the interlocking members are engaged in the hook holes of the lug walls of the respective first engaging member in a snap fit engaging manner, and the limiting plate of each of the interlocking members has two opposite sides and is substantially in contact with the interconnecting wall of the respective first engaging member and the first peripheral wall of the first housing part at the two opposite sides thereof, respectively; and
   wherein each of the lug walls of each of the first engaging members comprises an end defining a shoulder, each of the cantilevers of each of the interlocking members cooperates with the base plate to define an elbow, and the elbows of each of the interlocking members are engaged with the shoulders of the lug walls of the respective first engaging member.

2. The display housing of claim 1, wherein the limiting plate of each of the interlocking members is generally U-shaped and comprises two opposite arms, and each of the interlocking members further comprises two opposite reinforcing ribs on the base plate respectively connected to the arms of the limiting plate.

3. A display housing adapted to accommodate a display panel, the display housing comprising:
   a first housing part comprising a first peripheral wall and a plurality of first engaging members formed on the first peripheral wall;
   a second housing part comprising a plurality of second engaging members; and
   a plurality of interlocking members, each of which is detachably connected to and interlocks a respective one of the first engaging members and a respective one of the second engaging members so as to secure the first housing part to the second housing part such that the first and second housing parts cooperatively define an accommodating space therebetween capable of accommodating the display panel therein;
   wherein each of the first engaging members has two opposite lug walls and an interconnecting wall, the lug walls protrude from the first peripheral wall of the first housing part into the accommodating space, the interconnecting wall interconnects the lug walls and cooperates with the lug walls and a portion of the first peripheral wall of the first housing part to define a slot, each of the lug walls defines a first hook hole in spatial communication with the slot, and the interconnecting wall defines a second hook hole; and
   wherein each of the interlocking members comprises a base plate, two opposite cantilevers extending from the base plate, two opposite reinforcing ribs on the base plate, and a limiting plate extending from the reinforcing ribs between the cantilevers and being received in the slot of the respective first engaging member, each cantilever and the limiting plate comprises a hook end, the cantilevers of each of the interlocking members are received in the slot of the respective first engaging member, the hook ends of the cantilevers of each of the interlocking members are engaged in the first hook holes of the respective first engaging member in a snap fit engaging manner, the hook end of the limiting plate is engaged in the second hook hole of the respective first engaging member in a snap fit engaging manner, and each of the cantilevers of each of the interlocking members is substantially in contact with the peripheral wall of the first housing part.

4. A display housing adapted to accommodate a display panel, the display housing comprising:
   a first housing part comprising a plurality of first engaging members;
   a second housing part comprising a plurality of second engaging members; and
   a plurality of interlocking members, each of which is detachably connected to and interlocks a respective one of the first engaging members and a respective one of the second engaging members so as to secure the first housing part to the second housing part such that the first and second housing parts cooperatively define an accommodating space therebetween capable of accommodating the display panel therein;
   wherein each of the interlocking members comprises a base plate and two interlocking ends disposed at two opposite sides of the base plate respectively, one of the two interlocking ends is engaged with the respective one of the second engaging members, the other interlocking end is engaged with the respective one of the first engaging members, and the respective one of the first engaging members abuts against the side of the base plate adjacent to the respective one of the first engaging members.

5. The display housing of claim 4, wherein the interlocking members have a breaking strength less than that of the first and second engaging members.

6. The display housing of claim 4, wherein each of the first engaging members comprises two opposite lug walls protruding from the first housing part into the accommodating space and an interconnecting wall interconnecting the lug walls, the lug walls cooperate with the interconnecting wall and a corresponding portion of the first housing part to define a slot, the slot accommodates the other interlocking end of the respective interlocking member.

7. The display housing of claim 6, wherein each of the lug walls of each first engaging member defines a first hook hole, the other interlocking end of the respective interlocking member comprises two opposite cantilevers extending from the base plate and inserted into the slot of the first engaging member, and each of the cantilevers includes a hook end engaged in a corresponding one of the first hook holes of the first engaging member.

8. The display housing of claim 7, wherein the other interlocking end of the respective interlocking member further comprises a limiting plate extending from the base plate between the cantilevers and inserted into the slot of the first engaging member, the limiting plate comprises a hook end, and the interconnecting wall of the first engaging member comprises a second hook hole interlockingly receiving the hook end of the limiting plate.

9. The display housing of claim 7, wherein the one of the two interlocking ends of each interlocking member that is engaged with the respective one of the second engaging members comprises a hole, the respective second engaging member comprises a lip protrusion protruding from the second housing part into the accommodating space, and the hole of the one of the two interlocking ends engagingly receives the lip protrusion.

10. The display housing of claim 8, wherein a direction for inserting the cantilevers into the slot is perpendicular to a direction for engaging the hook end of each cantilever in the corresponding first hook hole.

11. The display housing of claim 9, wherein a direction for inserting the cantilevers into the slot is perpendicular to a direction for engaging the one of the two interlocking ends with the respective one of the second engaging members.

* * * * *